March 10, 1936.    J. M. DUNLEA    2,033,127
INCLINOMETER
Filed June 24, 1929

Inventor
John M. Dunlea, deceased
by Dorothea Dunlea, Administratrix
By Martin P. Smith Atty.

Patented Mar. 10, 1936

2,033,127

UNITED STATES PATENT OFFICE 2,033,127

INCLINOMETER

John M. Dunlea, deceased, late of Los Angeles, Calif., by Dorothea Dunlea, administratrix, Los Angeles, Calif.

Application June 24, 1929, Serial No. 373,387

19 Claims. (Cl. 33—215)

This invention relates to an inclinometer that is particularly designed for use on airplanes or other aircraft, and the present invention is an improvement upon the inclinometer set forth in U. S. Letters Patent No. 1,607,881, granted Nov. 23rd, 1926.

The principal objects of the present invention are, to generally improve upon and simplify the construction of the inclinometer set forth in the aforesaid patent, as well as other forms of similar instruments, further, to provide a device which, while functioning primarily as an inclinometer, to indicate the fore and aft tilt or inclination of an airplane or airship, will also indicate acceleration or retardation, thereby making it possible to determine the effect of these forces on the indication of inclination and thus ascertain more correctly than by devices heretofore used, the fore and aft inclination of the craft to which the device is attached.

A further object of the invention is, to provide an inclinometer that is relatively simple in construction, easily read, convenient in form, economizing space on an instrument board and inexpensive of manufacture.

A still further object of the invention is, to provide an inclinometer that is complete within itself and which will perform its intended functions without the use of extraneous parts or appliances, yet comparatively light in weight and the effectiveness of which is not affected by magnetism, altitude, temperature or variable atmospheric pressures.

With the foregoing and other objects in view, the invention consists in certain novel features of construction and arrangement of parts that will hereinafter be more fully described and claimed and illustrated in the accompanying drawing, in which:

Figures 1, 2, 3, 4, 5:
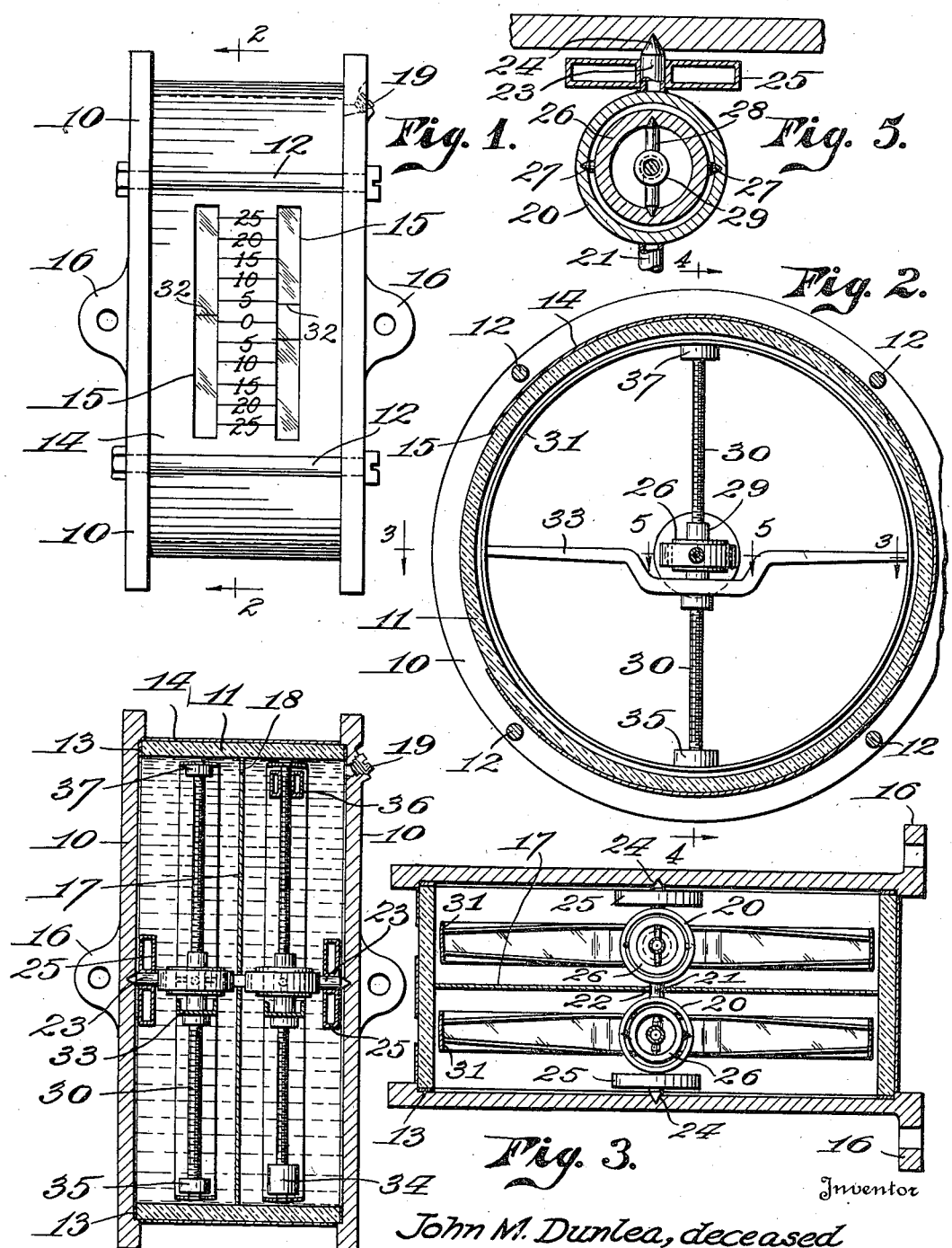
Fig. 1 is a front elevational view of an inclinometer embodying the principles of the invention.
Fig. 2 is a cross section taken approximately upon the line 2—2 of Fig. 1.
Fig. 3 is a horizontal section taken on the line 3—3 of Fig. 2.
Fig. 4 is a vertical cross section taken on the line 4—4 of Fig. 2.
Fig. 5 is an enlarged horizontal detail section taken on the line 5—5 of Fig. 2.

Referring by numerals to the accompanying drawing which illustrates a preferred embodiment of the invention, 10, 10 designates side plates, preferably of metal, which, together with a short ring or cylinder 11 of glass, form the housing of the improved inclinometer, and when assembled the ring or cylinder of glass is positioned between the plates 10 and clamped in such position by means of transverse bolts 12, that pass through the edges of the plates 10 just outside said ring or cylinder.

Suitable packing rings 13 are interposed between the ends of the ring or cylinder 11 and the inner faces of the side plates 10 and applied to the outer face of the ring or cylinder 11 is a thin shell or layer 14 of translucent or opaque material and formed therein on the front side of the housing are parallel slots 15 that function as windows or sight openings.

Appearing on the outer face of the shell 14, between the windows 15 is a graduated scale, the marks or graduations of which may be suitably numbered, but for all practical purposes it is desirable to number the central mark zero and the marks in both directions being correspondingly numbered in sequence.

Formed on the rear portions of the side plates 10 are perforated ears 16, by means of which the instrument may be mounted upon a suitable support.

Arranged within the housing, comprising the plates 10 and ring 11, is a centrally arranged partition 17 of thin sheet metal or the like, preferably non-rusting and fairly rigid, the same lying parallel with the side plates 10 and formed through said partition near the upper edge thereof is an aperture 18, that permits the liquid that fills the housing to readily flow from one side of the partition to the other.

The entire chamber within the housing is filled with a suitable liquid that is introduced through a filler opening that is formed in the upper portion of one of the plates and which opening is normally closed by a screw plug or cap 19.

Arranged respectively within the chambers between the partition 17 and the side plates 10, are rings 20 that are rigidly connected by a short shaft 21, the latter projecting through an opening 22 that is formed in the center of partition 17 and projecting outwardly from the rings 20, are attached trunnions 23, having conical outer ends that bear in corresponding recesses 24, which latter are formed in the inner faces of the side plates at the centers thereof.

In order to reduce the friction between the conical ends of the trunnions and their bearings 24, suitable buoyant members 25, preferably in the form of hollow discs, are mounted on the trunnions 23.

Arranged within each ring 20 is a concentric ring 26 and projecting radially outward therefrom, at right angles to the axis of the ring 20, which axis is formed between shaft 21 and the trunnions 23, are short trunnions 27 that bear in the ring 20 and thus the ring 26 is mounted to rock freely within the ring 20 and as its axis is disposed at right angles to the axis of the rocking movement of said ring 20, the entire structure provides a universal joint.

Arranged within each ring 26 and coaxial with the shaft 21 is a short shaft 28, the pointed ends of which bear in said ring 26 and carried by the central portions of each shaft is a vertically disposed tubular member 29. Seated in each of these tubular members is the central portion of a rod 30 having threaded end portions.

Secured to the ends of each rod 30 is a ring or circular band 31, preferably of fairly rigid thin metal and which bands are slightly smaller in diameter than the internal diameter of the glass ring 11.

As a result of this arrangment, the outer faces or peripheries of the thin metal bands 31, are visible through the window or openings 15 in the shell 14 and formed on the outer face of each band is a mark 32 which, under normal conditions, or while the craft upon which the device is located is on an even or level keel, is aligned with the zero mark upon the graduated scale between the windows 15.

In order to maintain the bands 31 in the form of rings so that all portions thereof are concentric with the glass ring 11, horizontally disposed braces 33 are arranged on the rods 30 just below the tubular members 29 and the outer ends of these braces are secured to the inner faces of the bands 31. These braces 33 occupy positions at right angles to the rods 30.

In order that the bands 31 and the parts that carry the same may function as independent pendulums, weights 34 and 35 are mounted on the lower portions of the threaded rods 30. Weight 34 is relatively heavier than the weight 35 and said weight 34 is preferably located on the lower portion of the threaded rod 30 that is located in the chamber to the right of the central partition 17. This relative arrangement of weights is utilized, in order that one pendulum structure will respond more readily to accelerative forces than the other. These weights may be raised or lowered as desired, by screwing same upwardly or downwardly on the threaded rods.

Mounted on the threaded upper portion of the rod in the right hand chamber within the housing and which is the same rod that carries the heavier weight 34, is a float or buoyant member 36, likewise threaded for adjustment on said rod, that tends to lift the pendulum with which it is associated and consequently minimize the friction that is developed within the bearings that support said rod.

Scew seated on the upper portion of the threaded rod that forms a part of the pendulum within the lefthand chamber in the housing, is a weight. member 37 relatively smaller than weight member 35 and this member 37 may be lowered or raised as desired, on threaded rod 30. The differential between weights 37 and 35, is sufficient to produce a pendulum effect, but at the same time, this pendulum structure is nearly in balance, and weight 37 exerts pressure on the bearings of the pendulum structure to which it is attached, thereby tending to retard the movements of the pendulum through the liquid in which it is immersed.

Thus two pendulums are provided, one of which with weights 35 and 37, is of relatively small unbalanced mass and carries all weight upon its bearings. The other, with weight 34 and float 36, has a large unbalanced mass and, because of the float 36, most of the weight is supported by the fluid and a relatively small amount is carried on its bearings.

When the aircraft upon which the instrument is mounted, tilts either fore or aft, neglecting the effects of acceleration or retardation either angular or linear, the two pendulum structures will, by gravity, maintain their normal vertical positions, while the housing, that is fixed on the aircraft will tilt either forwardly or rearwardly, depending upon the tilt of the airplane, so that the marks 32 on the bands 31 will appear through the windows or openings 15 above or below the zero mark of the graduated scale, thus indicating the degree of tilt and also denoting the absence of acceleration or retardation through coincidence of the positions of the marks 32 on the two bands.

The liquid filling the housing will likewise not be disturbed, the housing rotating around the liquid. The pendulums are both stationary relative to the liquid and therefore, both the effect of unbalanced weight and of fluid friction and inertia, tend to maintain both pendulums at vertical, both therefore, indicating true inclination by the position of marks 32 relative to the housing. The swing in this instance takes place between the housing and trunnions 23 to which rings 20 are attached.

However, fore and after tilting of a plane is always accompanied by corresponding changes in angular and often linear acceleration, which disturb the pendulum registrations and cause them to read other than the true angle during such time as this acceleration is effective.

The problem of the pilot is, first to know whether any accelerative forces are causing the inclinometer to read other than the true angle.

In this instrument, the two pendulums operate together when indicating pure inclination, being substantially equally sensitive for this purpose.

By making the moments of inertia of the two pendulums different as described, the forces produced on the pendulums by acceleration will be different. Fluid resistance on the two pendulums is substantially the same including skin friction of the bands 31 and the vane effects of the braces 33 and rods 30. Therefore, as the pendulums must move within and relative to the fluid, when moved by accelerative forces, the pendulum with the largest unbalanced moment will have a greater net effective force to cause movement thereof (after subtracting fluid resistance) than will the pendulum with the smaller unbalanced moment (after subtracting the same fluid resistance). Thus under the same acceleration, the pendulum of the greater effective moment has a greater lag on acceleration and a greater movement on retardation than the one of the lesser effective moment or in other words, having a greater force available, will be more sensitive to accelerative forces.

Under a given acceleration then, the two pendulums move to different degrees upon their individual shafts 28, and thus give different readings on the graduated scale. When the two pendulums thus read differently the pilot knows an accelerative force is affecting the readings and that a correction must be made to obtain accurate inclination. When they read the same, he can rely upon their indication as being true, except under unusual conditions of which the pilot would be fully aware.

This variation in swing under accelerative forces is primarily determined by the viscosity and density of the fluid used and the net effective weights involved, as the positions of the weights are approximately the same relative to the pivot center. A slight unbalanced weight in a viscous fluid will move very slowly and the movement under a given impulsive acceleration will be smaller than that of a pendulum with a greater amount of unbalance.

Most accelerations in normal airplane flight which disturb inclination readings are angular, caused by the actual changes in inclination. These are of short duration, but it is just during such a change in angle that the pilot desires to know his correct inclination.

A given plane responds to normal stick movements in substantially the same manner at its normal cruising speed, and will affect the reading of the pendulums in the same manner. The threaded rods 30 make adjustment possible whereby the instrument may be calibrated and the sensitivity of the pendulum may be varied by changing the lever arms of the net effective weights for a given airplane, and a given instrument position thereon, to maintain the desired approximate proportional movement under these normal conditions. The pilot may calculate the error induced by these accelerative forces and with experience estimate very accurately his true inclination.

For example, if the ship to which this instrument is attached, starts to climb, there is likely to be negative acceleration or decrease in speed, as ascent is commenced. Immediately, the two pendulums will separate, by reason of their varied responses to either acceleration or retardation.

While both indicators will now tend to show ascent due to the angular tilt of the housing going with the ship, the indicators by reason of this negative acceleration will tend to descend to varied degrees. Now if the lefthand pendulum has been arranged to respond to acceleration only one-half as much as the righthand pendulum, for example, the lefthand pendulum, upon retardation of the craft, will appear on the scale in a higher position relative to the righthand pendulum, having responded only half as much to the retardation as said righthand pendulum.

Knowing this rate of response to be one-half, the difference between the readings of the two indicators at the maximum pendulum swings, doubled, will give the actual amount of inclination due to acceleration error, and since acceleration has minimized or subtracted from the real amount or true angle of ascent, this amount of error added to the righthand pendulum's reading, will immediately give the true angle of ascent of the ship.

In the case of descent of the ship, the pendulums will, by reason of lag, due to increase in speed, act in reverse, and knowing the relative response of the pendulums, the amount of lag can be quickly determined and added to the reading of the righthand pendulum, to learn the true angle of descent.

Referring to Figure 1, of the drawing, wherein the righthand indicator on the more sensitive pendulum reads, plus 4 degrees and the lefthand indicator reads, plus 2 degrees, the righthand indicator being above the lefthand one shows that the movement of the indicators has been upward; the indicators are ascending at different rates of speed.

This indicates a lag of the pendulums due to increasing speed, the most sensitive pendulum having the largest weight, lagging most, on account of its greater inertia.

Now for example, if the instrument has been calibrated to give a two to one ratio of movement between the two pendulums, the pilot immediately knows that this reading indicates his inclination is zero and that he is accelerating his speed.

Similarly should the righthand pendulum be at minus 4 degrees, and the lefthand one at minus 2 degrees, the indicators are descending at different rates of speed showing that the pendulums have swung forward from the vertical due to decreasing speed. Owing to the fact that the readings are in two to one ratio, the pilot knows that this is purely decreased speed and that his inclination is still zero.

Inclination of the plane, simply rotates the housing 10 about the pendulums.

Supposing the housing rotated in Figure 1, bringing the 5 degree below horizontal mark on the scale of the housing up to the 0 degree position, indicating an inclination of 5 degrees downward, the pendulums remaining in the positions shown in Fig. 1. The indicator readings will then be minus 1 degree for the more sensitive pendulum and minus 3 degrees for the less sensitive one. The more sensitive one is still above the less sensitive one, indicating increasing speed and thus, that a downward correction is necessary. The true inclination will be figured thus, minus 1 degree minus 2×2 degrees equals minus 5 degrees.

The pilot therefore, can tell from the instrument whether positive or negative corrections should be made to the indicator readings. If the righthand pendulum is above the lefthand one, the acceleration correction is downward on the scale; if below, the acceleration correction is upward on the scale.

The amount and rapidity of separation of the two indicators both enable the pilot to estimate the amount of this correction. In most cases the amount of separation can be used to compute closely the correction necessary. In other cases, the rapidity of movement combined with the extent of movement of the indicators enables close estimation of the correction to be made.

Thus, it will be seen that the proper functioning of the improved inclinometer depends upon the two separately acting pendulum structures arranged side by side and operating within a body of liquid and having the same axis, one pendulum being arranged for greater freedom of movement through the liquid so that it will respond more readily to acceleration or retardation of the craft upon which the instrument is mounted, then the other pendulum which is retarded in its response to these forces and the two separately operating pendulum structures are provided with marks that cooperate with a fixed graduated scale, so that the degree of tilt may be readily ascertained though the forces of either acceleration or retardation cause the pendulums to swing to different degrees.

The floats utilized with the pendulum structures exert a lifting effect, so as to minimize the friction that is produced in the bearings for said pendulum structures and the liquid that fills the chamber that is occupied by the pendulums, exerts a damping effect that counteracts any jerking or sudden movements of the pendulums.

The universal joint mounting of the pendulums accomplishes two purposes: first by maintaining true vertical, accuracy of reading is assured, and second, the pendulums are free under lateral tilt and do not produce cramping stresses in the sensitive bearings such as would cause sluggishness in the pendulum action.

The partition 17 divides the space within the housing into two chambers practically of uniform volume, both of which are filled with liquid and as a result, each pendulum structure may operate without in any way influencing or affecting the operation of the other structure.

Thus, it will be seen that the herein described inclinometer is relatively simple in construction, inexpensive of manufacture, entirely automatic in its operation and very effective in performing the functions for which it is intended.

It will be understood that minor changes in the size, form and construction of the various parts of the inclinometer may be made and substituted for those herein shown and described without departing from the spirit of the invention, the scope of which is set forth in the appended claims.

What is claimed is:

1. In an inclinometer, the combination with a liquid filled housing, a portion of the wall of which housing is transparent, of a pair of independently operating pendulum structures arranged for operation side by side within said housing, a universal joint supporting each pendulum structure for swinging movement, a portion of each pendulum structure being visible through the transparent portion of the wall of said housing, said housing being provided with a graduated scale that is arranged between said pendulum structures and said pendulum structures having different moments of inertia about their axes of swing so as to create a differential in the movements of the two pendulum structures through the liquid in which they are immersed.

2. In an inclinometer, the combination with a liquid filled housing, of a pair of pendulum structures, means mounting said pendulums for independent swinging movement side by side within said housing, which means includes universal joints between said pendulum structures and said housing, a weight and a float carried by one of said pendulum structures and weights carried by the other pendulum structure, said weights being disposed on said pendulums in a manner to give different moments of inertia to said pendulums.

3. In an inclinometer, the combination with a liquid filled housing, of a pair of pendulum structures, means mounting said pendulums for independent swinging movement side by side within said housing, said means including universal joints supporting said pendulum structures, a weight and float carried by one of said pendulum structures, weights carried by the other pendulum structure, said weights being disposed on said pendulums in a manner to give different moments of inertia to said pendulums and co-operating means on said pendulum structures and housing for indicating the relative degree of movement between said housing and pendulum structures.

4. In an inclinometer, a housing forming a chamber, a pair of pendulum structures, means mounting said pendulum structures side by side for independent movement within the chamber in said housing, said means including universal joint between each pendulum structure and said housing, the chamber within said housing being filled with liquid, a float carried by one of said pendulum structures and said pendulum structures having different moments of inertia about their axis of swing to create a differential in their movements through the liquid in which they are immersed.

5. In an inclinometer, a housing forming a chamber, a pair of pendulum structures, means mounting said pendulums side by side for independent movement within said housing, said means including universal joints supporting said pendulum structures, the chamber within said housing being filled with liquid, a float carried by one of said pendulum structures, said pendulum structures having different moments of inertia about their axis of swing to create a differential in their movements through the liquid in which they are immersed and cooperating means on said pendulum structures and housing for indicating the relative degree of movement between said housing and pendulum structures.

6. In an inclinometer, a housing forming a chamber, a pair of pendulum structures, means mounting said pendulums side by side for independent swinging movement within said housing, said means including universal joints between said pendulum structures and said housing, the chamber within said housing being filled with liquid, a weight and float adjustably carried by one of said pendulum structures and weights adjustably carried by the other pendulum structure, said weights being different and disposed on said pendulums in a manner to give different moments of inertia to said pendulums.

7. In an inclinometer, a housing forming a chamber, a pair of pendulum structures, means mounting said pendulum side by side for independent swinging movement within said housing, said means including universal joints between said pendulum structures and said housing, the chamber within said housing being filled with liquid, a weight and float adjustably carried by one of said pendulum structures, two weights adjustably carried by the other pendulum structure, all of the weights being of different sizes and cooperating means on said pendulum structures and housing for indicating the relative degree of movement between said pendulum structures and housing.

8. In an inclinometer, a housing forming a chamber that is filled with liquid, a pair of pendulum structures, means mounting said pendulums side by side for independent swinging movement within said housing, said means including universal joints between said pendulum structures and said housing, said pendulum structures being of different weights and having the same axis of swinging movement, said pendulum structures having different moments of inertia about their axis of swing, a partition within the housing between the pendulum structures, and co-operating means on said pendulum structures and housing for indicating the relative movements between said pendulum structures and housing.

9. In an inclinometer, a housing forming a chamber, a shaft journaled for operation in the center of said housing, differently weighted pendulums, a universal joint between each pendulum and said shaft, said housing and pendulum structures having cooperating means for indicating the relative movement between said pendulum structures and housing, floats carried by said shaft, a float carried by one of said pendulum structures, and the chamber within said housing being filled with liquid.

10. In an inclinometer, the combination with a housing forming a chamber that is filled with liquid, a horizontally disposed shaft journaled for operation within said housing, differently weighted pendulum structures, a universal joint between each pendulum structure and said shaft and cooperating means on the pendulums and housing for indicating the relative degree of swinging movement between said pendulums and between said pendulums and said housing.

11. In an inclinometer, the combination with a housing forming a chamber, that is filled with liquid, a horizontally disposed shaft journaled for operation within said housing, differently weighted pendulum structures, a universal joint between each pendulum and said shaft, said housing and pendulum structures having cooperating means for indicating the relative degree of swinging movement between said pendulums and between said pendulums and said housing, floats carried by said shaft and a float carried by one of said pendulum structures.

12. In an inclinometer, a housing forming a chamber, a pair of pendulum structures arranged side by side within said housing, a universal joint between each pendulum structure and said housing, the chamber within said housing being filled with liquid, a float and weight adjustably carried by one of said pendulums, weights adjustably carried by the other pendulum structure and cooperating means on said pendulum structures and said housing for indicating the relative degree of movement between said pendulums and between said pendulums and said housing.

13. In an inclinometer, a housing, a horizontally disposed shaft arranged for operation within said housing, independently operating pendulum structures supported upon said shaft within the housing, universal joints between said shaft and pendulum structures, means carried by said pendulum structures whereby the positions of the centers of gravity thereof may be changed and cooperating means on said pendulum structures and housing for indicating the relative degree of movement between said pendulum structures and housing.

14. In an inclinometer, a housing forming a chamber, a partition dividing the chamber within said housing into two compartments, a pendulum structure mounted by means of a universal joint for operation in each compartment, the two pendulum structures having the same axis, means carried by said pendulum structures whereby the positions of the centers of gravity thereof may be changed, the two compartments being filled with liquid, and cooperating means on said pendulum structures and said housing for indicating the relative degree of movement between said housing and pendulum structures.

15. In an inclinometer, a housing provided with separate chambers, independently operating pendulum structures mounted by means of universal joints for operation within said chambers, said pendulum structures having the same axis and having different moments of inertia about their axis of swing and cooperating means on said pendulum structures and said housing for indicating the degree of relative movement between said housing and pendulum structures.

16. An inclinometer, including a liquid filled housing, a pendulum carrier pivoted therein, two pendulums pivotally mounted in said carrier for independent swing relative thereto and each having its pivotal axis mounted for independent swing in a plane passing through the axis of said pendulum carrier, said pendulums having different moments of inertia and means for indicating the positions of said pendulums relative to said housing.

17. An inclinometer including a liquid filled housing, two pendulums independently mounted coaxially therein for independent swinging movement relative thereto, one of said pendulums being constructed to have less frictional resistance to motion than the other and means for indicating the position of said pendulums relative to said housing.

18. An inclinometer including a liquid filled housing a pendulum carrier pivoted therein, two pendulums pivotally mounted for independent free swinging movement relative thereto on said carrier, so constructed and arranged as to respond in different degrees to motion changes of said housing, and means for indicating the positions of said pendulums relative to said housing.

19. An inclinometer including a liquid filled housing, a pendulum carrier pivoted therein, two pendulums pivotally mounted in said carrier for independent swinging movement relative thereto, means attached to said carrier for floating the weights thereof, to increase sensitivity of response of said pendulums and means for indicating the positions of said pendulums relative to a given point on said housing.

DOROTHEA DUNLEA,
*Administratrix of the Estate of John M. Dunlea, Deceased.*

CERTIFICATE OF CORRECTION.

Patent No. 2,033,127.   March 10, 1936.

DOROTHEA DUNLEA,
ADMINISTRATRIX OF JOHN M. DUNLEA, DECEASED.

It is hereby certified that error appears in the printed specification of the above numbered patent requiring correction as follows: Page 2, second column, line 34, for the word "after" read aft; page 4, second column, line 2, claim 4, for "joint between each pendulum structure" read joints between said pendulum structures; and line 40, claim 7, for "pendulum" read pendulums. In the drawing, Figure 1, strike out the lower horizontal line leading to the reference numeral "32"; and strike out Figure 3 and insert instead the following:

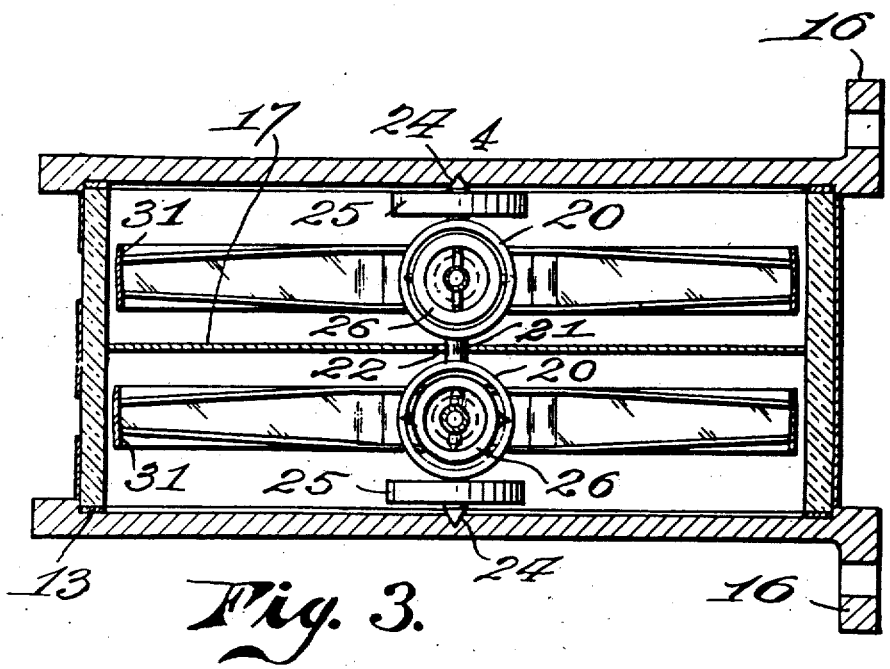

Fig. 3.

and that the said Letters Patent should be read with these corrections therein that the same may conform to the record of the case in the Patent Office.

Signed and sealed this 25th day of August, A. D. 1936.

Leslie Frazer
Acting Commissioner of Patents.

(Seal)